United States Patent

Al Ghatta et al.

[11] Patent Number: 5,714,571
[45] Date of Patent: Feb. 3, 1998

[54] PROCESS FOR THE CRYSTALLIZATION OF POLYESTER RESINS

[75] Inventors: Hussain Ali Kashif Al Ghatta, Fiuggi; Dario Giordano, Tortona, both of Italy

[73] Assignee: Sinco Engineering S.p.A., Italy

[21] Appl. No.: 561,490

[22] Filed: Nov. 20, 1995

[30] Foreign Application Priority Data

Nov. 21, 1994 [IT] Italy .................. MI94A2355

[51] Int. Cl.[6] .................. C08G 63/00; C08F 6/00
[52] U.S. Cl. .................. 528/308.2; 528/308.2; 528/308.3; 528/481; 528/492; 528/502; 528/503
[58] Field of Search .................. 528/308.2, 308.3, 528/481, 492, 502, 503

[56] References Cited

U.S. PATENT DOCUMENTS 3,405,098  10/1968  Heighton et al. .
5,119,570  6/1992  Russemeyer et al. .

FOREIGN PATENT DOCUMENTS

0379684A3  8/1990  European Pat. Off. .
1561316    3/1969  France .
2020733    7/1970  France .
1905677   10/1969  Germany .
2614231   10/1977  Germany .

*Primary Examiner*—Samuel A. Acquah
*Attorney, Agent, or Firm*—Edward D. Manzo; Mark J. Murphy; Ted K. Ringsred

[57] ABSTRACT

Aromatic polyester resins are continuously crystallized in a fluid bed crystallizer, where the fluidizing gas (nitrogen) enters at a temperature not lower than 195° C. and the average residence time is higher than 5 minutes.

22 Claims, 2 Drawing Sheets

PROCESS FOR THE CRYSTALLIZATION OF POLYESTER RESINS

BACKGROUND OF THE INVENTION

The present invention relates to an improved process for continuous crystallization of polyester resins and the equipment used in the process.

Aromatic polyester resins, particularly polyethyleneterephthalate (PET), the copolymers of the terephthalic acid with minor proportions of isophthalic acid and polybuthyleneterephthalate, find wide application both in the fibres and films area, or as a molding material.

For fibres and films the intrinsic viscosity of the resin is in general between 0.6 higher values, which are with difficulty directly obtainable by the polycondensation process of the resin.

The intrinsic viscosity is increased to the required values (in general higher than 0.75 dl/g) by means of solid state polycondensation (SSP) processes of the resin, at a temperature in general between 200° and 230° C.

The starting resin used for the SSP process is in the amorphous state. Therefore, it is therefore necessary to take it to a sufficient degree of crystallinity before being submitted to the SSP process.

The crystallization is necessary order to avoid polymer chips plugging in the polycondensation reactor. The reactor is in general formed by a vertical moving bed, where the polymer fed from the top is passed through by an inert gas stream which removes the volatile residual products of the polycondensation reaction (ethylene glycol and acetaldehyde in the case of polyethyleneterephthalate).

The chips of amorphous PET tend to soften at 70°–80° C. To avoid chips agglomerating among them and forming encrustations and plugs in the equipment, in some processes, the chips are maintained under continuous movement in order to avoid being in contact among them for too long a time with consequent irreversible crystalline increase of the particles and agglomerates formation crushing-resistant.

Processes of this type are in discontinuous. The most widespread continuous processes use particular mechanical mixers where the chips are subjected to a forced movement. The temperatures in these process are in general between 180° and 220° C.

The subsequent polycondensation step is carried out at temperatures higher than those used during the crystallization (U.S. Pat. No. 4,161,578) or the treatment is carried out at temperatures relatively high, between 220° and 260° C., and then the polycondensation process is carried out at temperatures in general lower than those of crystallization (U.S. Pat. No. 4,064,112).

A drawback of the mechanical mixers is that the polymer has a tendency to stick on the mixer and/or on the mixer walls.

A fluidized bed that does not require mechanical inserts does not have the troubles of the mechanical mixers.

The use of a whirling fluidized bed has the drawback that the residence times of the particles coming from the bed are distributed in a wide range of values with consequent wide distribution of polymer crystallinity values.

The SSP process, to be effective, requires that the polymer crystallinity is as uniform as possible.

Uniform values of crystallization degree are obtained by combining the whirling fluidized bed with a fluid bed acting with piston movement.

The piston movement of the bed results in residence times with very narrow distribution and obviates the broad distribution of the crystallinity values deriving from the use of the whirling fluidized bed. A crystallization process of this type is described in the U.S. Pat. No. 5,119,570.

The material obtainable with this process presents however such a high agglomerates percentage (higher than 40%) that it is necessary to have a de-agglomeration process before sending the material to the SSP stage.

The crystallinity degree obtainable at the exit from the whirling bed is relatively low too, about 3–4% of polymer is in the amorphous state.

The final crystallinity at the exit of the piston bed is uniform, but it does not reach the high values (about 33% of crystallinity).

The process management is problematic due to the difficulty of maintaining the piston movement in the bed and the facility by which the bed tends to break in a continuous process and to pass to a mixing condition.

SUMMARY OF THE INVENTION

It has been unexpectedly found in the present invention that it is possible to crystallize polyester resins in a whirling fluidized bed (with mixing characteristic) obtaining, surprisingly, at the exit of this bed, uniform values of polymer crystallinity. This result renders unnecessary the use of fluidized beds with piston movement.

It has been moreover found, and this is another aspect of the present invention, that the material coming out from the whirling fluidized bed is practically free from agglomerates and reaches a high crystallinity value.

The high crystallinity degree of the material coming out from the fluidized bed, between 38 and 42%) allows use, without problems, mechanical mixers acting at temperatures higher than those used in the fluidized bed, and equal, for example, to those used in the SSP stage.

DETAILED DESCRIPTION OF THE PRESENTLY PREFERRED EMBODIMENTS

The crystallization process in the whirling fluidized bed of the present invention is characterized by the fact that the inert gas used for the bed fluidification is fed to the bed at a temperature not lower than 195° C. and between 195° and 235° C., and the average residence time of the particles that pass through the bed is higher than 5 minutes and is in general between 5 and 50 minutes. Times higher than 50 minutes can be used but do not lead to significant improvements of the polymer properties.

Preferably, the temperature is between 210° and 230° C. More preferably, the temperature is between 210° and 225° C., and the residence times are between 7 and 15 minutes.

The linear speed of the gas is higher than the minimum one required for the fluidification and is in general between 3 and 5 m/sec.

The fluid bed is preferably divided into two compartments, defining different volumes communicating between them at the top of the bed and fed from bottom separately by the fluidification gas.

The amorphous polymer is fed from the top of the section with a larger volume and is conveyed by the gaseous stream into the second compartment where conditions of whirling bed are also maintained.

The gas which feeds this compartment leads the fine polymer particles out of the bed through an exit placed in the upper side of the compartment. The polymer is discharged from the bottom.

Figure 1:
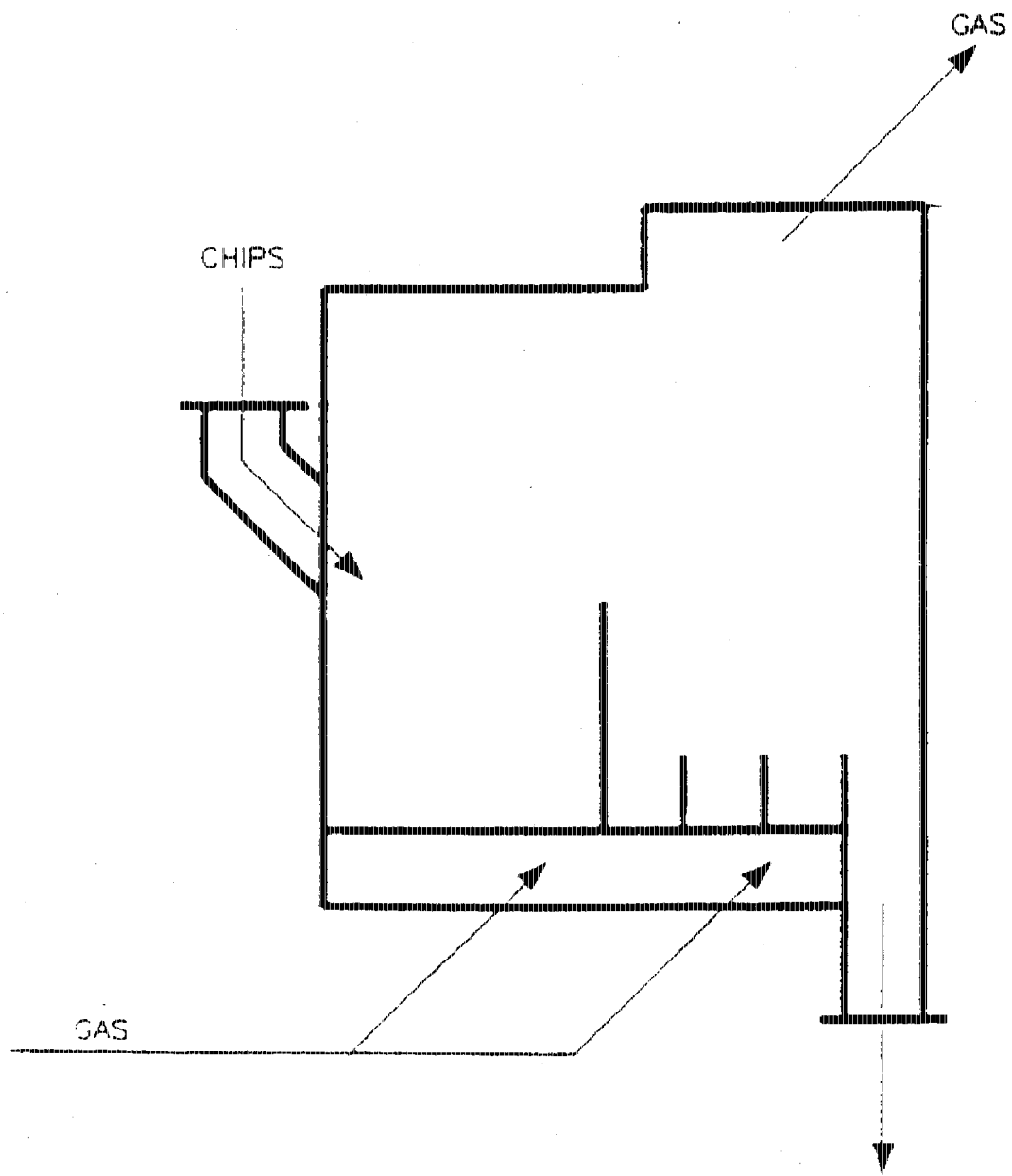
FIG. 1 illustrates a fluid bed for use in the present invention.

FIG. 1 shows such a bed.

The PET coming out of the fluid bed crystallizer of the present invention has a crystallinity degree between 38 and 42% by weight with a difference with respect to the maximum and minimum value and referred to the average value in general lower than one percent unit. No amorphous polymer is present, and, as already indicated, the polymer is agglomerates free.

The polymer is subsequently brought to the desired crystallinity value corresponding to 40–50% by weight by means of subsequent crystallization processes, which are conveniently carried out in the mechanical mixers where the polymer is longitudinally moved while it is, at the same time, subjected to a strong radial mixing.

The process is carried out at temperatures of the chips of about 10°–30° C. higher than that of the chips coming out from the fluidized bed.

The residence time is in general between 20 and 70 minutes.

Figure 2:
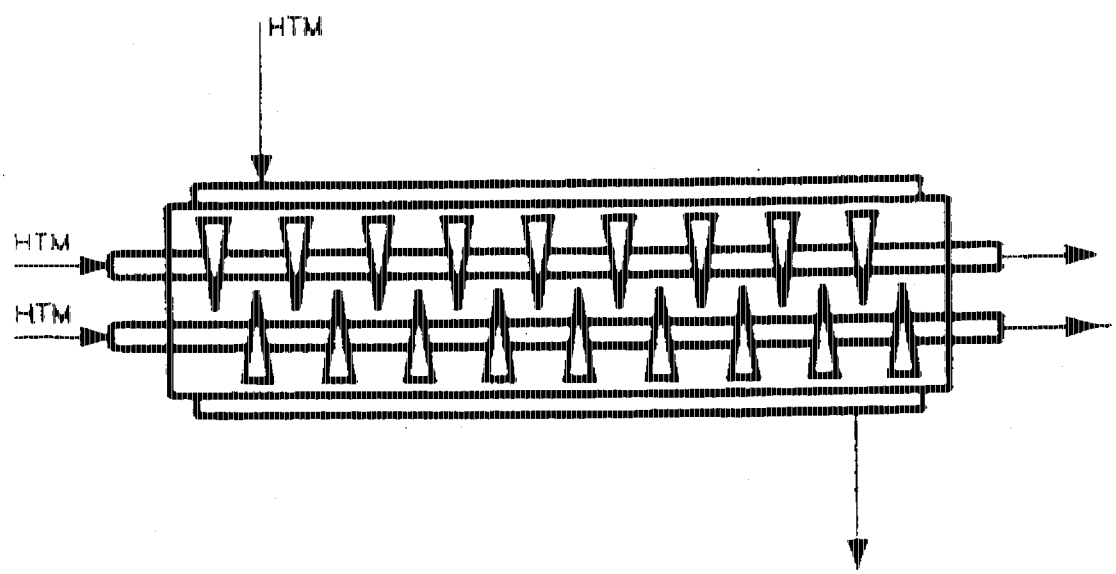
FIG. 2 illustrates a top view of a mixer with two blade shafts with countercurrent movement.

The chips coming out from this mixer feed another mechanical mixer where they are subjected to temperature conditions corresponding to that one used in the following SSP reactor. The residence time of this second mixer is in general between 20 and 70 minutes. FIG. 2 shows a mixer where (with top view) two blades shafts with counterrotating movement are represented.

In these mixers, an inert gas is also used, preferably nitrogen, which is circulating countercurrent to the polymer.

The purpose of the second crystallizer is to give to the polymer an appropriate crystal organization quantifiable through the shift to the highest temperature of the pre-melting peak measurable by DSC. The higher this peak is, the better the crystalline organization is and also the efficacy of the following SSP process.

The completion of the polymer crystallization coming from the fluidized bed can be carried out, besides using crystallizers with forced movement, also by using other equipment such as two standard whirling fluidized beds in series or a whirling fluidized bed combined with a mechanical mixer.

The SSP process is carried out in a vertical fixed bed reactor where the chips coming out from the crystallization end-stage feed the reactor from the top and come out of the bottom.

The temperature in the polycondensation reactor is in general corresponds to the one used in the last crystallization step. It can be higher or lower but is in general between 210° and 240° C.

The residence times are of a few hours and in general between 5 and 15 hours. The kinetics of the intrinsic viscosity increase can be considerably increased if the polymer is preferably added in the molten state before the crystallization step with a polyfunctional compound containing two or more groups capable of reacting with condensation or addition reaction with the OH and COOH end groups of the polyester.

The pyromellitic anhydride, and in general the dianhydrides of tetracarboxylic aromatic or aliphatic acids, are examples of such compounds.

These compounds are used in a quantity in general between 0.1 and 2% by weight on the polymer.

The pyromellitic anhydride is the preferred compound. The use of these compounds is described in EP-B-422282 and in U.S. Pat. No. 5,243,020, U.S. Pat. No. 5,334,669 and U.S. Pat. No. 5,338,808 whose description is herewith incorporated by reference.

The polyester resins used in the crystallization process of the present invention comprise the polycondensation products of $C_2C_{20}$ diols such as ethylene glycol, butylene glycol, 1,4 cyclohexandiemethyol with aromatic bicarboxylic acids such as terephthalic acid, 2,6-naphthalene bicarboxylic acid or their reactive derivatives such as the lower alkylic esters, such as, for example, dimethylterephthalate.

Polyethyleneterephthalate is the preferred resin. Beside the terephthalic units, also units derived from other bicarboxylic acids such as the isophthalic acid and the napththalenedicarboxylic acids can be present in a quantity of about from 0.5 to 20% by weight.

The polyester resin to be subjected to the crystallization process is in granular form, particularly in the form of chips.

The inert gas used for the fluidization is preferably nitrogen. This gas, coming out from the fluid bed, is sent, together with the gas coming from polycondensation step, to a purification unit. In the purification unit the gas is subjected to oxidation at a temperature in general between 250° and 600° C. in the presence of oxidation catalysts containing Pt or Pt and Pd mixtures, preferably using oxygen in stoichiometric quantity with respect to the impurities present in the gas to be depurated.

A purification process of this type is described in PCT/EP93/03117 application whose description is herewith incorporated by reference.

The gas coming out from the oxidation reactor is optionally subjected to a hydrogenation process with hydrogen to eliminate the oxygen excess. A part is recycled to the fluid bed without previous drying, and the remaining part is sent to a drying step and then recycled in part to the fluid bed and in part to the polycondensation stage.

The following examples are given to illustrate but not to limit the invention.

EXAMPLE 1

A quantity of 8330 Kg/h of amorphous polyester polymer was fed in a whirling fluid bed precrystallized with characteristics as shown in FIG. 1 (Step 1).

The amorphous polyester is chip-shaped with 2×2.5×2.5 mm dimensions and is a copolyethyleneterephthalate containing units deriving from isophthalic acid in percentage of 2.3%, the intrinsic viscosity is of 0.60 dl/g.

The average residence time in the fluid bed is of 10 minutes.

In this step $N_2$ was used as fluidization gas having an average speed in the bed of 3.2 m/s.

The gas temperature at the entrance of the bed was 220° C. and was maintained constant by means of an electrical heater.

The polymer coming out from the bed fed two mechanical mixers (steps 2 and 3 respectively) with the characteristics as shown in FIG. 2.

The residence time in each step was 22 minutes. The chip temperature was 211° C. in step 2 and 208° C. in step 3.

Table 1 shows the results obtained at the exit of each step. At the exit of the first step, neither agglomerates nor chips with the amorphous original characteristics unchanged are found. The crystallization distribution measured obtained an average value of 37.3%, between a minimum of 36.3% and a maximum of 38.1%.

At the exit of steps 2) and 3) average values of crystallinity of 41.3% and 44.3% were found, respectively.

The test was repeated (tests 2 and 3) using the same polymer but changing the process conditions.

As shown in Table 1, the requisites, as absence of agglomerates and amorphous material at the exit of step 1, as well as the distribution of the crystallinity percentage around an average value, remained unchanged.

EXAMPLE 2

The test of example 1 was repeated using a different thermal profile.

The data concerning the used condition and the dispersion of the crystallinity distribution are shown in Table 2.

Also in this case, samples were collected at the exit of step 1 and, amorphous polymer and conglomerates were absent.

Table 2 shows the data concerning the solid state polycondensation process (SSP reactor).

The polymer intrinsic viscosity at the exit of the SSP reactor was 0.8 dl.

TABLE 1

|  | Test | | |
| --- | --- | --- | --- |
|  | 1 | 2 | 3 |
| Solid feed in step 1 Kg/h | 8330 | 8330 | 10000 |
| Fluidization gas temp. °C. | 220 | 225 | 225 |
| Fluidization gas speed m/sec | 3.2 | 3.2 | 3.2 |
| Average residence time step 1-min | 10 | 10 | 8.5 |
| Average residence time step 3-min | 22 | 22 | 25 |
| Amorphous polymer % after step 1 | 0 | 0 | 0 |
| Agglomerates % after step 1 | 0 | 0 | 0 |
| Crystallization degree after step 1-% | 37.3 | 40.8 | 37.3 |
| Crystallization degree max/min after step 1-% | 38.1/36.3 | 41.5/39.8 | 38.2/36.4 |
| Crystallization degree after step 2 - % | 41.3 | 44.0 | 40.05 |
| Crystallization degree after step 3 - % | 44.3 | 45.5 | 43.0 |

TABLE 2

| Step 1 | | Step 2 | | Step 3 | | SSP reactor | |
| --- | --- | --- | --- | --- | --- | --- | --- |
| $T_{mr}$ | $T_s$ | $T_{mr}$ | $T_s$ | $T_{mr}$ | $T_s$ | $T_{mr}$ | $T_s$ |
| 225 | 221 | 220 | 211 | 206 | 208 | 200 | 208 |
| % cryst. | | % cryst. | | % cryst. | | % cryst. | |
| 39.8 | 42 | 43.6 | 44.5 | 46.4 | 47.2 | 56.8 | 58.9 |

$T_{mr}$ = Heating medium temperature
$T_s$ = Temperature of the solid coming out from the step.

The crystallinity percentage was determined with a densitometric column.

The intrinsic viscosity was determined in a solution of 0.5 g of polyester pallet in 200 ml of a solution at 60/40 by weight of phenol and tetraclorethane operating at 25° C. according to ASTM-4603-86.

What is claimed is:

1. Continuous process for crystallization of polyester resins using fluid bed crystallizers, comprising the step of feeding an amorphous granular polymer to a fluidized whirling bed wherein the temperature of a fluidification inert gas entering the bed is between approximately 195° and 230° C., and the average residence time of the polymer in the bed is higher than 5 min.

2. Process according to claim 1, wherein the temperature is between 210° and 220° C. and the average residence time is between 7 and 15 min.

3. Process according to claims 1 or 2, further comprising the step of submitting the polymer coming out from the fluidized bed to subsequent crystallization steps, having a chip temperature increased by between 10° and 30° C. and a residence time between approximately 30 and 70 min.

4. Process according to claim 3 wherein the polymer is fed to a mechanical mixer which moves the polymer longitudinally and submits the polymer to radial mixing.

5. Process according to claim 4, wherein the polymer coming out from the mechanical mixer is fed to a second mixer operating at a temperature of the mechanical which mixer corresponds to the temperature used in a solid state polycondensation step of the resin.

6. Process according to claim 3, wherein the crystallization steps are carried out in at least one fluidized bed.

7. Process according to claims 1 or 2, wherein fluidification inert gas is nitrogen.

8. Process according to claims 1 or 2, wherein the polyester resin is polyethyleneterephthalate or copolethyleneterephthalate containing from 1 to 20% of isophthalic acid units.

9. Process according to claims 1 or 2, wherein the resin coming out from the fluidized bed has a crystallinity degree between 38 and 42% by weight.

10. Process according to claim 9, wherein the resin coming out from the fluidized bed does not contain amorphous polymer fractions and is agglomerates free.

11. Process according to claim 2 wherein the resin coming out from the crystallization steps has a crystallinity degree of between 40 and 50% by weight.

12. Process according to claim 3, wherein the polyester resin is polyethyleneterephthalate or copolyethyleneterephthalate containing from 1 to 20% of isophthalic acid units.

13. Process according to claim 4, wherein the polyester resin is polyethyleneterephthalate or copolyethyleneterephthalate containing from 1 to 20% of isophthalic acid units.

14. Process according to claim 5, wherein the polyester resin is polyethyleneterephthalate or copolyethyleneterephthalate containing from 1 to 20% of isophthalic acid units.

15. Process according to claim 6, wherein the polyester resin is polyethyleneterephthalate or copolyethyleneterephthalate containing from 1 to 20% of isophthalic acid units.

16. Process according to claim 7, wherein the polyester resin is polyethyleneterephthalate or copolyethyleneterephthalate containing from 1 to 20% of isophthalic acid units.

17. Process according to claim 3, wherein the resin coming out from the crystallization steps has a crystalinity degree of between 40 and 50% by weight.

18. Process according to claim 4, wherein the resin coming out from the crystallization steps has a crystallinity degree of between 40 and 50% by weight.

19. Process according to claim 5, wherein the resin coming out from the crystallization steps has a crystallinity degree of between 40 and 50% by weight.

20. Process according to claim 6, wherein the resin coming out from the crystallization steps has a crystallinity degree of between 40 and 50% by weight.

21. Process according to claim 3, wherein the crystallization steps are carried out in a fluidized bed combined with mechanical mixers.

22. Process according to claim 21, wherein the polyester resin is polyethyleneterephthalate or copolyethyleneterephthalate containing from 1 to 20% of isophthalic acid units.

* * * * *

UNITED STATES PATENT AND TRADEMARK OFFICE
CERTIFICATE OF CORRECTION

PATENT NO. : 5,714,571
DATED : February 3, 1998
INVENTOR(S) : Hussain Ali Kashif AL GHATTA and Dario GIORDANO It is certified that error appears in the above-identified patent and that said Letters Patent is hereby corrected as shown below:

Col. 1, line 14, delete "higher values, which" and insert -- -0.75 dl/g. For the molding material, the values are necessarily higher and --;

Column 1, Line 22, delete "therefore" (second occurrence);

Column 1, Line 25, after "necessary" insert --in--;

Column 1, Line 26, delete "in";

Column 2, Line 7, after "however" insert a comma;

Column 2, Line 34, delete ")";

Column 2, Line 35, after "problems" insert --of--;

Column 4, Line 25, after "unit" (second occurrence) insert a comma.

Signed and Sealed this

Third Day of November, 1998

Attest:

Attesting Officer

BRUCE LEHMAN

Commissioner of Patents and Trademarks